United States Patent
Dube et al.

(10) Patent No.: US 7,720,970 B2
(45) Date of Patent: May 18, 2010

(54) METHOD FOR PROCESSING RECEIVED NETWORKING TRAFFIC WHILE PLAYING AUDIO/VIDEO OR OTHER MEDIA

(75) Inventors: Aditya Dube, Redmond, WA (US); Alireza Dabagh, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1263 days.

(21) Appl. No.: 11/239,755

(22) Filed: Sep. 30, 2005

(65) Prior Publication Data

US 2007/0076704 A1    Apr. 5, 2007

(51) Int. Cl.
G06F 15/173 (2006.01)
G06F 13/24 (2006.01)
G06F 9/46 (2006.01)

(52) U.S. Cl. .................. 709/226; 709/225; 710/266; 718/107

(58) Field of Classification Search .......... 709/226, 709/225; 710/266; 718/107
See application file for complete search history.

(56) References Cited

U.S. PATENT DOCUMENTS

| | | | |
|---|---|---|---|
| 6,272,548 B1 * | 8/2001 | Cotter et al. | 709/239 |
| 6,278,708 B1 * | 8/2001 | Von Hammerstein et al. | 370/389 |
| 6,370,125 B1 * | 4/2002 | Belk | 370/312 |
| 6,961,539 B2 * | 11/2005 | Schweinhart et al. | 455/12.1 |
| 7,093,015 B2 * | 8/2006 | Gubbi et al. | 709/225 |
| 7,330,900 B2 * | 2/2008 | Burger et al. | 709/231 |
| 7,496,086 B2 * | 2/2009 | Eckberg | 370/352 |
| 2004/0153302 A1 * | 8/2004 | Mukund et al. | 703/14 |
| 2004/0196852 A1 * | 10/2004 | Aksu et al. | 370/395.21 |
| 2004/0264488 A1 * | 12/2004 | Yoon et al. | 370/412 |

* cited by examiner

Primary Examiner—Wing F Chan
Assistant Examiner—Nam Thai
(74) Attorney, Agent, or Firm—Wolf, Greenfield & Sacks, P.C.

(57) ABSTRACT

A method of providing media content (e.g., audio and/or video) and processing data received over a network. Received data may be processed at a reduced rate while at least one media application is running. Received packets may be processed in batches, and media data may be processed in between processing the batches. The method may provide for reducing or eliminating glitches in the media content caused by receiving data over a network while providing the media content.

17 Claims, 5 Drawing Sheets

METHOD FOR PROCESSING RECEIVED NETWORKING TRAFFIC WHILE PLAYING AUDIO/VIDEO OR OTHER MEDIA

BACKGROUND OF INVENTION

1. Field of Invention

The invention is related generally to processing received packets, and more particularly to processing received packets while providing media content.

2. Discussion of Related Art

Various applications are available that enable a user to listen to audio content or watch video content using a computer.

An audio application may enable reading audio information from a compact disk (CD) or an audio file (e.g., an MP3 file). The audio application may also enable playing the audio for a user. For example, a user may use the audio application to listen to music or other types of audio content.

Similarly, a video application may enable reading video information stored on a digital video disk (DVD) or in a video file (e.g., MPEG file). The video application may also enable displaying the video for a user. For example, a user may use the media application to watch a movie or other types of video content.

SUMMARY OF INVENTION

The inventors have appreciated that a user's experience of media content may be impacted when packets are received over a network. On prior systems, processing the received packets would take priority on a processor, thus preventing a media application from processing for a period of time. A media application that was running would have to wait until the processor was finished processing the received packets to process media data. In some circumstances, the processor would take a significant amount of time to process the received packets, and a glitch would occur in the media content provided to the user. For example, if the media application was playing music, the music would be interrupted.

In one aspect of the invention, when a media application is running, packets received over the network may be processed in batches that are spaced apart in time. The batches may be spaced far enough apart in time that a media application can process media data in between the processing of the batches. The duration of the processing of each batch may be limited. Embodiments of the invention may enable a media application to provide media content with a relatively low number of glitches.

In another aspect, the invention relates to a method, implemented on a computer, of providing media content. The method includes receiving a notification that at least one media application is running. The method also includes processing, in response to receiving the notification that the at least one media application is running, no greater than a maximum number of packets during a first time interval. The packets are received over a network. The method further includes providing the media content to a user at least partially using the media application.

In yet another aspect, the invention relates to a computer-readable medium having computer-executable instructions implemented by a processor for performing steps. The steps include receiving a notification that at least one media application is running. The steps also include processing received data, in response to receiving the notification that the at least one media application is running, for a time interval less than a maximum time interval. The received data is received over a network. The steps further include providing media content to a user at least partially using the media application.

In a further aspect, the invention relates to a method implemented on a computer, of providing media content. The method includes receiving a notification that media content is being provided. The method also includes processing received data at a reduced rate in response to receiving the notification that media content is being provided. The received data is received over a network. The method further includes providing the media content to a user.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Various media applications are available that provide media content, e.g., music or movies, to a user of a device. To provide the media content, the media application may process media data on a processor associated with the device (e.g., a computer). If the media application is unable to use the processor for a period of time, a glitch may occur in the media content that is provided to the user. As a consequence, the user's experience of the media content may be impacted. For example, music or movies may not play smoothly. Humans may be able to detect even brief glitches. For example, the human ear may be able to detect audible glitches as brief as 0.5 ms.

It may be desirable to prevent glitches or limit the number of glitches that occur to provide a high quality experience for the user.

The inventors have appreciated that glitches may occur when packets of data are received over a network. In prior systems, when a group of packets was received, the group of packets would be processed immediately by the processor. The processing of packets received over the network would take priority over the playing of AN data on the processor, effectively monopolizing the processor until the processing of the packets was finished. In some circumstances, the processing of the packets would prevent a running media application from using the processor for a period of time, causing a glitch to occur in the content that was provided to a user.

In one aspect of the invention, the rate at which received packets are delivered to the processor may be limited when a media application is running. For example, packets may be delivered to the processor in batches that are separated in time, allowing the media application time to process media data in between the processing of the received packets.

Figure 1:
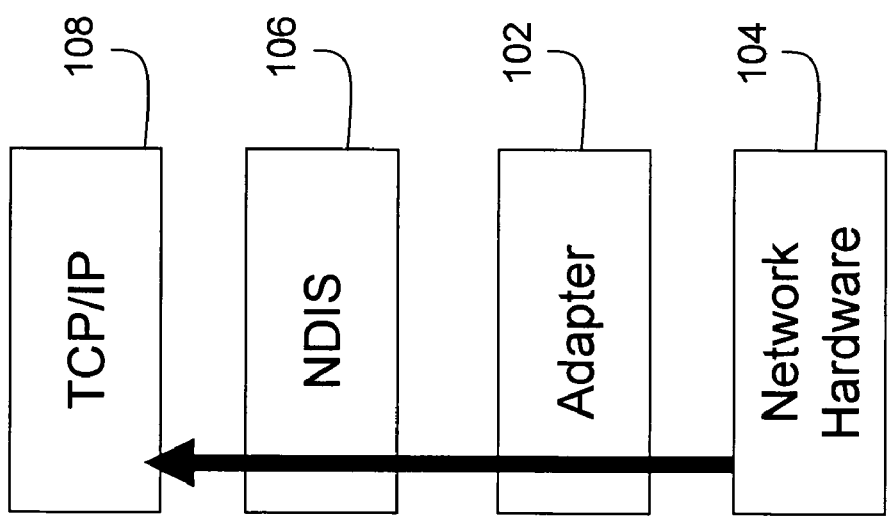
FIG. 1 is a block diagram illustrating an example of a relationship between modules used for processing data received over a network.

FIG. 1 is a block diagram illustrating an example of a relationship between modules (e.g., software modules) that may be used by prior systems for processing packets received over a network. The systems may use an adapter module 102, a network driver interface specification (NDIS) module 106, and a network protocol module 108, e.g., TCP/IP. The systems may also include a network hardware component 104 configured to interface with a network.

In prior systems, when packets of data are received by the network hardware component 104, they are passed to TCP/IP via the adapter module 102 and NDIS module 106. Once TCP/IP receives the packets, each of the packets are then processed by the processor. TCP/IP may not allow for other applications (e.g., a media application) to use the processor until all of the packets that have been passed to TCP/IP are processed.

For example, if network hardware module 104 receives one hundred packets, it may pass the packets to the TCP/IP stack via adapter module 102 and NDIS module 106. Once TCP/IP receives the packets, it may then transfer all one hundred packets to the processor to be processed. The processing of the one hundred packets may take priority over any processing currently being done on the processor until each of the one hundred packets has been processed.

Figure 2:
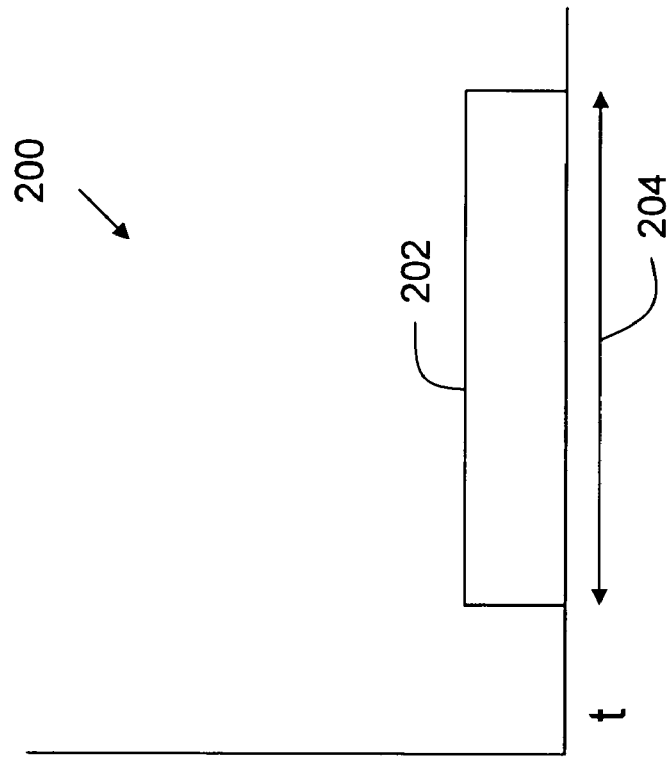
FIG. 2 is a timing diagram illustrating an example of a timing waveform representing the processing of received packets over time.

FIG. 2 is a timing diagram 200 illustrating an example of a timing waveform 202. In this example, timing waveform 202 represents the processing of packets in prior systems. The times at which timing waveform 202 are high represent times when the processor is processing received packets. The times at which timing waveform 202 are low represent times when the processor is not processing received packets, and may be available for other processing. The processor may be occupied with processing the packets for a time interval 204. During time interval 204, the processor may not be capable of processing other data, e.g., media data.

One or more media applications may be running on the device. If the duration of time interval 204 is long enough, a glitch may occur in the media content provided to a user.

In one embodiment of the invention, the rate at which packets are provided to network protocol module 108 may be reduced when a media application is running. For example, rather than processing a large batch of packets, several smaller batches of packets may be processed at different times.

Figure 3:
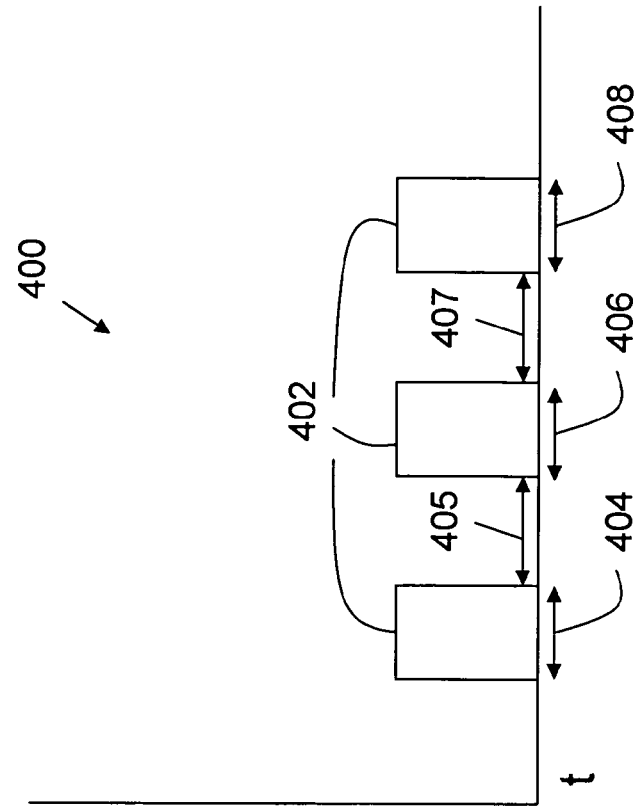
FIG. 3 is a is a block diagram illustrating an example of a relationship between modules according to one embodiment of the invention.

FIG. 3 is a block diagram illustrating an example of a relationship between modules that may be implemented on a device according to one embodiment of the invention. This embodiment may be implemented on a general-purpose computer system described in further detail below and/or on any other suitable device. The device may be communicatively coupled to a network from which packets or other data may be received. In this embodiment, the NDIS module 306 may perform one or more aspects of the invention.

The embodiment illustrated in FIG. 3 may include an adapter module 102, a network driver interface specification (NDIS) module 306, a network protocol module 108, e.g., TCP/IP, and a media service module 310. It may also include a network hardware component 104 configured to physically interface with a network.

Network hardware component 104 may be, for example, a wireless network card, an Ethernet card, a network interface card (NIC) or any other suitable hardware configured to interface with a network.

Adapter module 102 may be a software module configured to process data received via a network hardware component 104. For example, adapter module 102 may be a driver that interfaces with network hardware module 104.

NDIS module 306 may be a software module that provides a networking infrastructure for an operating environment running on the device. NDIS module 306 may provide an interface between the adapter module 102 and the network protocol module 108.

Network protocol module 108 may be a software module that provides for sending and receiving data via a network. Network protocol module 108 may be the TCP/IP stack. TCP/IP is used herein as an example of a suitable networking protocol that may be used in accordance with the invention. However, it should be appreciated that network protocol module 108 represents any suitable networking protocol.

Media service module 310 may be a software module that obtains information about one or more media applications. For example, media applications used on the device may subscribe to the media service, and may notify media service module 310 when the applications start and when they terminate. Media service module 310 may provide NDIS module 306 with information about one or more media applications. Media service module 310 may, for example, provide a notification to the NDIS module 306 when the first media application is started and when the last running media application is terminated. As another example, media service module 310 may provide NDIS module 306 with the type of media content (e.g., audio and/or video) that is being provided by the media application.

NDIS module 306 may receive the notification that a first media application has been started. In response to receiving this notification, the NDIS module 306 may reduce the rate at which packets received over a network are delivered to the network protocol module 108. For example, NDIS module 306 may limit the rate at which packets may be delivered to the network protocol module 108 to a maximum rate. The NDIS module 306 may not allow packets to be delivered to network protocol module 108 at a rate higher than the maximum rate until receiving a notification from media service module 310 indicating that the last media application has terminated. Once the last media application has been terminated, received packets may be allowed to be delivered to the network protocol module 108 at a rate higher than the maximum rate.

As discussed above, the rate at which packets are processed may be reduced by processing relatively small batches of packets during time intervals that are spaced apart in time.

Figure 4:
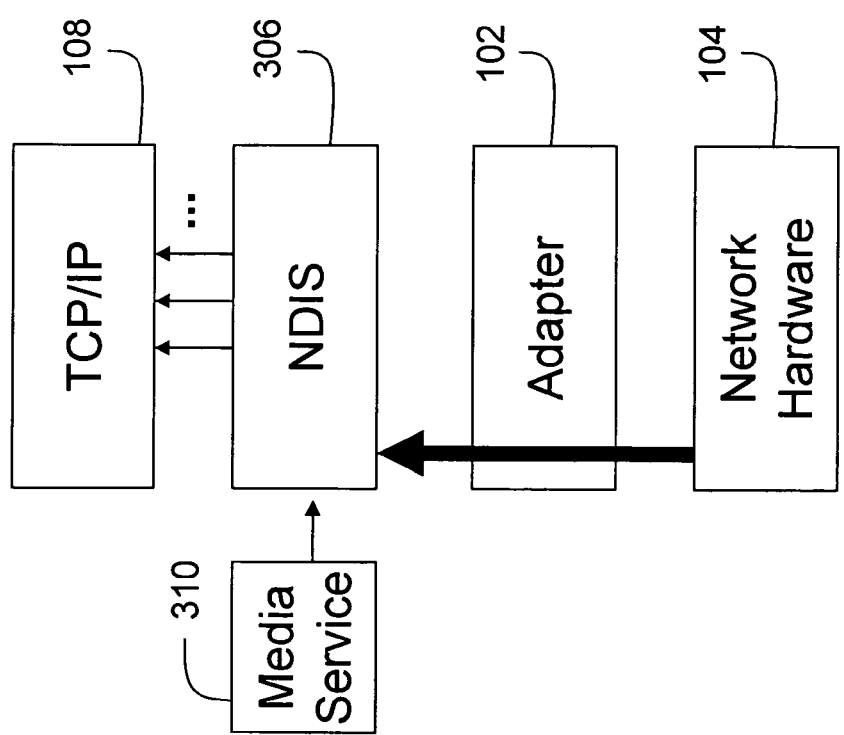
FIG. 4 is a timing diagram illustrating an example of a timing waveform representing the processing of received packets over time according to one embodiment of the invention.

FIG. 4 illustrates an example of processing packets during time intervals that are spaced apart in time. FIG. 4 includes a timing diagram 400 according to one embodiment of the invention. Timing diagram 400 includes a timing waveform 402 that illustrates the processing of received packets. The times at which timing waveform 402 are high represent times when the processor is processing received packets. The times at which timing waveform 402 are low represent times when the processor is not processing received packets, and may be available for other processing. The processor may be occupied with processing the packets during time intervals 404, 406 and 408. During time intervals 404, 406 and 408, the processor may not be capable of processing media data. However, media data may be processed during time intervals 405 and 407. Processing packets at time intervals that are spaced apart in time may allow a media application to process media data in between the processing of the packets.

In one aspect of the invention, the time intervals used for processing a batch of packets (e.g., time intervals 404, 406, and 408) may be limited to a maximum duration. The maximum duration of the processing of a batch may be set to be smaller than the minimum time interval for which an interruption of media content is perceptible to a human. For example, the maximum duration may be set to a predetermined duration, such as 0.5 milliseconds. However, 0.5 milliseconds is merely one example of a maximum duration that may be used for processing packets. The maximum duration may be set to any other suitable time period, and the invention is not limited to any particular implementation.

In one aspect of the invention, the maximum duration may be adjustable. For example, a user may be able to change the maximum duration by adjusting a setting associated with the computer.

As another example, the maximum duration may be adjusted automatically based on the type of media content that is being provided. Humans may detect glitches differently using different senses. For example, the human ear may be able to detect audio glitches of shorter duration than the duration of video glitches that the human eye can detect. Accordingly, in one aspect of the invention, the maximum duration of the processing of a batch of packets may be set to be larger when video content is being provided than when audio content is being provided.

In another aspect of the invention, the number of packets in a batch may be limited to a maximum number of packets while a media application is running. For example, the maximum number of packets may be set to a predetermined maximum number. As another example, the maximum number of packets may be determined based on the type of media content that is being provided.

One example of using a predetermined maximum number of packets per batch will now be described. One hundred packets may be received by the adapter 102 via network hardware module 104. Adapter 102 may pass the one hundred packets on to NDIS module 306, which determines from the media service 310 that a media application is running. The maximum number of packets in a batch to be processed may be set to ten packets. NDIS module 306 may transfer a batch of packets, e.g., ten or fewer packets of the one hundred packets to TCP/IP for processing, and the batch of packets may be processed during time interval 404.

Once a batch of packets is provided to TCP/IP, another batch of packets may not be provided to TCP/IP for certain time interval. For example, the next batch of packets may not be provided to the processor until the end of time interval 405, allowing a media application to process media data during time interval 405.

Media data is data that is related to providing media content. Media data may be processed by the media application to provide media content to a user. The media content may be audio content, video content, or any other suitable type of content. One media application may provide more than one type of content simultaneously or otherwise. In some circumstances, more than one media application may be running at the same time.

If the media application is providing audio content, the audio content may be provided by processing media data (e.g., audio data) and converting signals representative of the audio content into audible sounds perceptible to a human. The audible sounds may be produced by a computer speaker, a stereo system, headphones or any other suitable audio production device.

If the media application is providing video content, the video content may be provided by processing media data (e.g., video data) and converting signals representative of the video content into visual images perceptible to a human. The visual images may be produced by a computer monitor, television, LCD display, plasma display, or any other suitable image production device.

Figure 5:
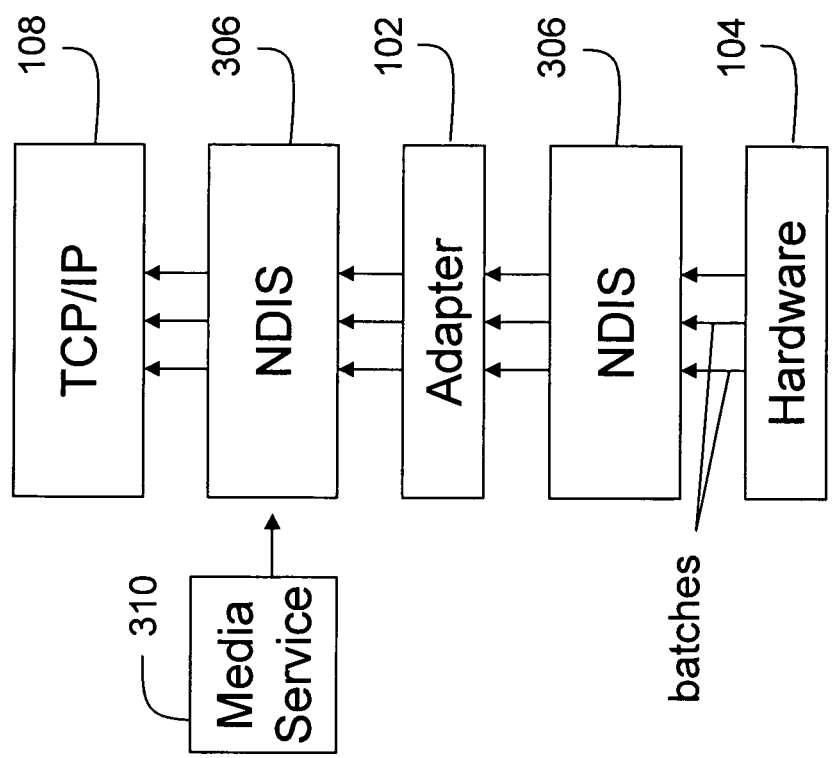
FIG. 5 is a block diagram illustrating an example of a relationship between modules according to another embodiment of the invention.

FIG. 5 illustrates another embodiment of the invention that includes several components previously described with respect to FIG. 3. In this embodiment, network hardware module 104 may communicate with NDIS module 306.

Figure 6:
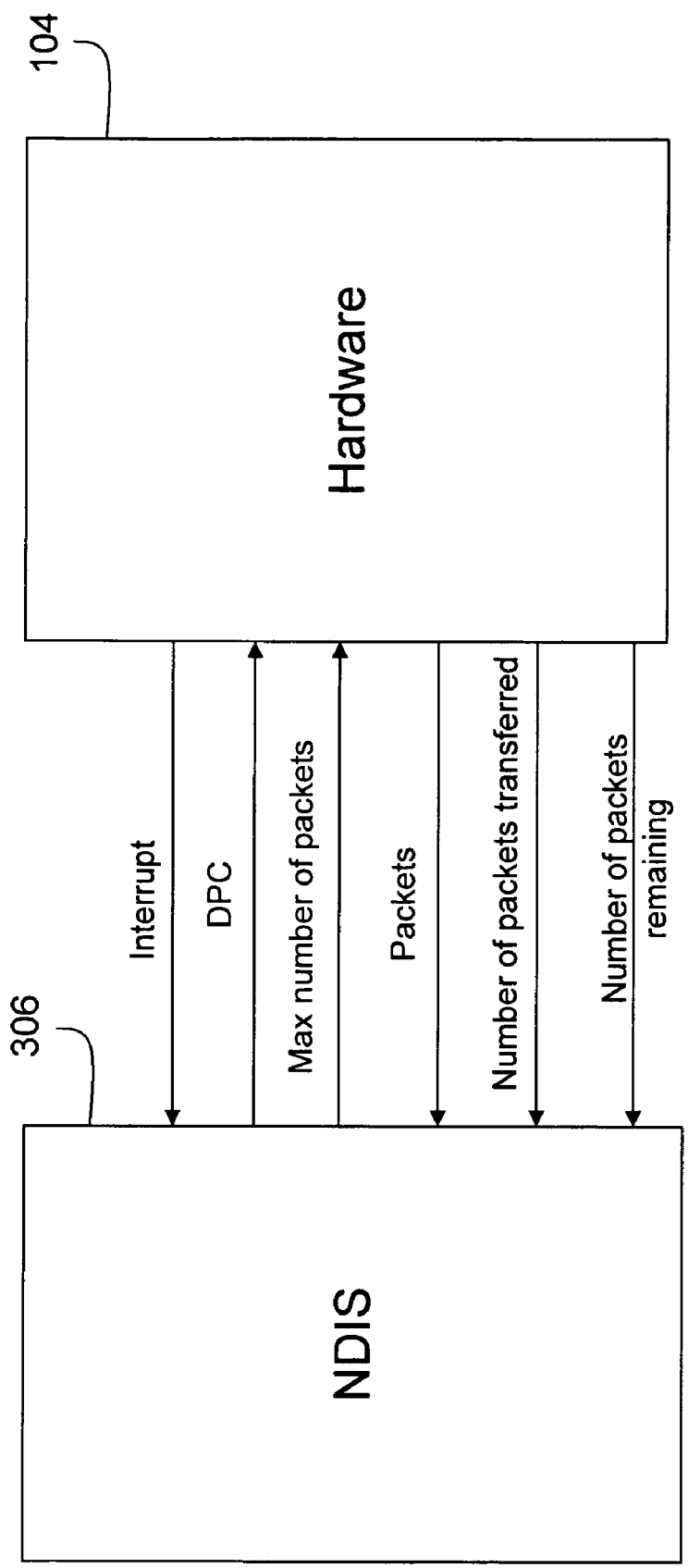
FIG. 6 is a flowchart illustrating an example of a method of processing data in accordance with embodiments of the invention.

FIG. 6 illustrates various data that may be transferred between network hardware module 104 and NDIS module 306 for processing one batch of packets. When the network hardware module 104 receives packets via the network, it may assert an interrupt. NDIS module 306 may then verify that network hardware module 104 asserted an interrupt. NDIS module 306 may subsequently invoke a deferred procedure call (DPC) to acquire the received packets from network hardware module 104. When the DPC is invoked, interrupts from network hardware component 104 are temporarily disabled, and NDIS module 306 may provide network hardware module 104 with a maximum number of packets that network hardware module 104 may provide in the DPC.

In response to receiving the DPC, network hardware module 104 may then provide received packets to NDIS module 306, although no greater than the maximum number of packets may be provided. The provided packets may be provided to TCP/IP, and processed during time interval 404, for example.

Network hardware module 104 may also provide NDIS module 306 with the number of packets that it is delivering to NDIS module 306 during the current DPC and the number of remaining packets to be delivered.

If the number of remaining packets to be delivered is greater than zero, NDIS module 306 may invoke another deferred procedure call, for example, at the end of time interval 405. Network hardware module 104 may then transfer another batch of packets to NDIS module 306.

NDIS module 306 may continue invoking DPCs until the number of remaining packets to be delivered is zero. At that time, interrupts may be re-enabled for network hardware device 104, and NDIS. module 306 may stop invoking DPCs to network hardware module 104 until network hardware module 104 asserts another interrupt.

In this embodiment, an operating system associated with the computer may limit the number of packets that network hardware module 104 may be allowed to transfer to the processor during a time interval. The operating system may prevent a network hardware module, e.g., a network interface card, from providing greater than a maximum number of packets to the processor at a time. Enforcing this policy using the operating system may facilitate providing media content regardless of the type of network hardware module that is used to receive networking data.

The maximum number of packets may be chosen in any suitable way. For example, the maximum number of packets may be set so that the duration of processing the maximum number of packets is smaller than a predetermined duration. The predetermined duration may be the minimum time interval for which an interruption of media content is perceptible to a human, e.g., 0.5 milliseconds.

In one aspect of the invention, the maximum number of packets may be determined automatically based on the rate at which packets are processed by the processor. The maximum number may be dynamically updated.

The rate at which packets are processed by the processor may be determined in any suitable way. For example, the rate may be determined by dividing the number of packets processed during a time period by the duration of the time period. The number of packets may be obtained from the number of packets that network hardware module 104 passes to NDIS module 306. For example, network hardware module 104 may pass this parameter to NDIS module 306 during each DPC.

The maximum number of packets per batch may be dynamically updated using any suitable algorithm.

In one implementation, the maximum number of packets may be increased until the time it takes to process a batch reaches a threshold (i.e., an unacceptably large time interval). The maximum number of packets may then be reduced.

For example, the maximum number of packets may be determined using a "slow-start" type of algorithm. This algorithm may initially increase the maximum number quickly until the maximum number is too high. Then the maximum number may be decreased to a lower number, and the maximum number may be increased at a rate slower than the initial increase until an acceptable maximum number is determined.

For example, the maximum number of packets may be set to 5 packets, then 10, then 15, then 20. If 20 packets take too long to process, then the maximum number may be decreased to 10. The maximum number may then be increased by 2 -to 10, 12, and then 14. Once it settles on a number, e.g. 16, NDIS module 306 may keep using that number. If the time to process 16 packets ever becomes too large, then NDIS module 306 may decrease the number to 14 and then 12. If the time to process 16 packets ever becomes too short, then NDIS may increase the number to 18, 20 and so on.

The maximum number may be updated at any suitable rate. For example, the maximum number may be updated after each DPC. As another example, the maximum number may be periodically updated at predetermined intervals.

Figure 7:
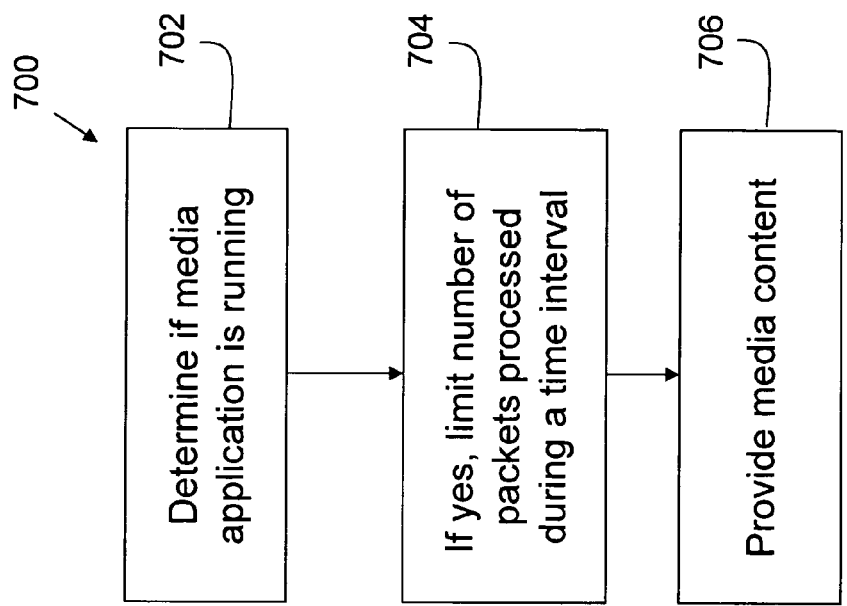
FIG. 7 is a flowchart illustrating an example of a method of providing media content, according to some embodiments.

FIG. 7 is a flow chart illustrating an example of a method 700 of providing media content. Method 700 includes acts 702, 704 and 706.

In act 702, it is determined whether or not a media application is currently running. The determination may be made by media service module 310 and/or NDIS module 306.

In act 704, the number of packets processed during a time interval may be limited to a maximum number of packets. NDIS module 306 may limit the number of packets by processed by providing batches of packets to network protocol module 108 at intervals that are spaced apart in time. However, any other suitable software and/or hardware module may be used to perform this aspect of the invention.

In act 706, media content may be provided. Media content may be provided at least partially using one or more media applications. Providing the media content may include processing media data and converting a signal representative of the media content into a human perceptible form. More than one type of media content may be provided.

Method 700 is not limited to the particular arrangement of acts illustrated in FIG. 7. Acts 702, 704, and 706 need not necessarily be performed in the order illustrated. For example, media content may be provided in act 706 prior to determining whether a media application is running. Some acts of method 700 may be performed concurrently to other acts. For example, media content may be provided in the act 706 concurrently to processing packets in the act 704. Method 700 may include further acts in addition to acts 702, 704 and 706.

Another method according to embodiments of the invention may include an act of determining whether media content is currently being provided. In response to determining that media content is being provided, received data may be processed at a reduced rate.

Particular ways of implementing aspects of the invention will now be described.

Methods described herein, acts thereof and various embodiments and variations of these methods and acts, individually or in combination, may be defined by computer-readable signals tangibly embodied on or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs that, as a result of being executed by a computer, instruct the computer to perform one or more of the functions described herein, and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems described herein, may be distributed across one or more of such components, and may be in transition therebetween.

The computer-readable media may be transportable such that the instructions stored thereon can be loaded onto any suitable computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. Further, the embodiments may be located on a single computer or may be distributed among a plurality of computers attached by a communications network.

For example, various aspects of the invention may be implemented as specialized software executing in a general-purpose computer system. The computer system may include a processor connected to one or more memory devices, such as a disk drive, memory, or other device for storing data. Memory is typically used for storing programs and data during operation of the computer system. Components of the computer system may be coupled by an interconnection mechanism, which may include one or more busses (e.g., between components that are integrated within a same machine) and/or a network (e.g., between components that reside on separate discrete machines). The interconnection mechanism enables communications (e.g., data, instructions) to be exchanged between system components. The computer system also includes one or more input devices, for example, a keyboard, mouse, trackball, microphone, touch screen, and one or more output devices, for example, a printing device, display screen, speaker. In addition, the computer system may contain one or more interfaces that connect the computer system to a communication network (in addition or as an alternative to the interconnection mechanism.

The storage system typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system, or in the memory system. The processor generally manipulates the data within the integrated circuit memory and then copies the data to the medium after processing is completed. A variety of mechanisms are known for managing data movement between the medium and the integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although the computer system discussed by way of example as one type of computer system upon which various aspects of the invention may be practiced, it should be appreciated that aspects of the invention are not limited to being implemented on the computer system. Various aspects of the invention may be practiced on one or more computers having a different architecture or components.

The computer system may be a general-purpose computer system that is programmable using a high-level computer programming language. The computer system may be also implemented using specially programmed, special purpose hardware. In the computer system, the processor is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (windows® ME) or Windows® XP operating systems available from Microsoft Corporation, MAC OS System X available from Apple Computer, the Solaris Operating System available from Sun Microsystems, UNIX available from various sources or Linux available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to communications network 100. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

Network 100 may be any suitable type of network such a local area network (LAN), wide area network (WAN), intranet, Internet or any combination thereof. For illustrative purposes, a limited number of devices are shown in this example. However, it is to be appreciated that many devices may be coupled to network 100. Although the devices are illustrated as being coupled directly to the network 100, the devices may be coupled to the network through one or more servers, routers, proxies, gateways, network address translation devices or any suitable combination thereof.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, J# (J-Sharp) or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method, implemented on a computer, of providing media content, the method comprising acts of:
    A) receiving a notification that at least one media application is running on the computer, the at least one media application providing media content to a user;
    B) processing, by the computer, in response to receiving the notification that the at least one media application is running on the computer, a number of received packets during a first time interval that is no greater than a maximum number of packets, the received packets being received over a network, wherein the maximum number of packets is set such that an amount of time used to process the maximum number of packets by the computer is less than an amount of time for which a delay in processing by the at least one media application causes an interruption of the media content that is perceptible to the user, wherein an operating system running on the computer limits the number of received packets processed by the computer during the first time interval to be no greater than the maximum number of packets; and
    C) providing the media content to the user at least partially using the at least one media application, such that processing the received packets does not cause an interruption in the media content that is perceptible to the user.

2. The method of claim 1, wherein the act C comprises processing at least a first portion of media data associated with the media application after the first time interval.

3. The method of claim 2, further comprising:
    D) processing, when the at least one media application is running, no more than a maximum number of the packets during a second time interval; and
    E) processing at least a second portion of the media data after the second time interval.

4. The method of claim 1, wherein a duration of the processing in the act B is less than or equal to 0.5 milliseconds.

5. The method of claim 1, wherein the processing of the packets is performed in batches and media data is processed between processing the batches.

6. The method of claim 1, wherein the computer comprises an adapter that receives packets over a network and a processor, wherein the operating system limits the number of received packets provided to the processor by the adapter during the first time interval to no greater than the maximum number.

7. The method of claim 1, wherein the maximum number of packets is dynamically adjusted to limit a duration of processing the packets to less than a predetermined duration.

8. The method of claim 1, further comprising acts of:
    D) determining a number of packets processed during the first time interval;
    E) determining an amount of time used to process the packets during the first time interval; and
    F) dynamically changing the maximum number of packets at least partially based on the number of packets processed and the amount of time used to process the packets.

9. The method of claim 8, wherein the maximum number of packets is dynamically changed by increasing the maximum number at a first rate until the maximum number reaches a threshold, decreasing the maximum number after the maximum number reaches the threshold, and then increasing the maximum number at a second rate slower than the first rate.

10. A computer-readable storage medium having computer-executable instructions implemented by a processor for performing steps comprising:
    A) receiving a notification that at least one media application is running, the at lease one media application providing media content to a user;
    B) processing received data using a processor, in response to receiving the notification that the at least one media application is running, for a time interval no greater than a maximum time interval, the received data being received by the at least one processor over a network, wherein the maximum time interval is less than an amount of time for which a delay in processing by the at least one media application causes an interruption of the media content that is perceptible to the user, wherein an operating system running on the processor limits an amount of time that the received data is processed by the processor to be no greater than the maximum time interval; and
    C) providing media content to a user at least partially using the at least one media application, such that processing the received data does not cause an interruption in the media content that is perceptible to the user, wherein the at least one media application is running on the at least one processor.

11. The computer-readable storage medium of claim 10, wherein the maximum time interval is less than or equal to 0.5 milliseconds.

12. The computer-readable storage medium of claim 10, wherein the step C comprises:
   providing media content while the media application is running, wherein media data is processed between processing the received data.

13. The computer-readable storage medium of claim 10, wherein the media content is provided to a user on a human perceptible medium, and the media content comprises audio and/or visual content.

14. A method, implemented on a computer, of providing media content, the method comprising acts of:
   A) receiving a notification that media content is being provided by the computer, a media application providing media content to a user;
   B) processing received data at a reduced rate by the computer in response to receiving the notification that media content is being provided, the received data being received by the computer over a network, wherein the reduced rate is less than a maximum rate, wherein the maximum rate is set such that an amount of time used to process the received data by the computer is less than an amount of time for which a delay in processing by the media application causes an interruption of the media content that is perceptible to the user, wherein an operating system running on the computer limits the reduced rate at which received data is processed by the processor to be no greater than the maximum rate; and
   C) providing, by the computer, the media content to a user on a human perceptible medium such that processing the received data does not cause an interruption in the media content that is perceptible to the user.

15. The method of claim 14, wherein a rate at which the received data is processed in the act B is no greater than a maximum rate.

16. The method of claim 14, wherein the received data is processed at a reduced rate by limiting an amount of the received data processed during a first time interval.

17. The method of claim 14, wherein the media content comprises audio and/or visual content.

\* \* \* \* \*

UNITED STATES PATENT AND TRADEMARK OFFICE
CERTIFICATE OF CORRECTION

| | | |
|---|---|---|
| PATENT NO. | : 7,720,970 B2 | |
| APPLICATION NO. | : 11/239755 | |
| DATED | : May 18, 2010 | |
| INVENTOR(S) | : Aditya Dube et al. | |

It is certified that error appears in the above-identified patent and that said Letters Patent is hereby corrected as shown below:

In column 12, line 50, in Claim 10, delete "lease" and insert -- least --, therefor.

Signed and Sealed this
Eighth Day of February, 2011

David J. Kappos
*Director of the United States Patent and Trademark Office*